United States Patent
Guha et al.

(10) Patent No.: US 11,904,502 B2
(45) Date of Patent: Feb. 20, 2024

(54) DISPERSED FIBER MAT FORMATION

(71) Applicant: CONTINENTAL STRUCTURAL PLASTICS, Auburn Hills, MI (US)

(72) Inventors: Probir Kumar Guha, Bloomfield Hills, MI (US); Michael J. Siwajek, Auburn Hills, MI (US); Philippe Bonte, Pouance (FR); Marc-Philippe Toitgans, Pouance (FR); Dominique Boyer, Pouance (FR)

(73) Assignee: Teijin Automotive Technologies, Inc., Auburn Hills, MI (US)

( * ) Notice: Subject to any disclaimer, the term of this patent is extended or adjusted under 35 U.S.C. 154(b) by 323 days.

(21) Appl. No.: 16/464,793

(22) PCT Filed: Nov. 29, 2017

(86) PCT No.: PCT/US2017/063602
§ 371 (c)(1),
(2) Date: May 29, 2019

(87) PCT Pub. No.: WO2018/102347
PCT Pub. Date: Jun. 7, 2018

(65) Prior Publication Data
US 2019/0283276 A1 Sep. 19, 2019

Related U.S. Application Data

(60) Provisional application No. 62/427,989, filed on Nov. 30, 2016.

(51) Int. Cl.
*B29B 13/08* (2006.01)
*B29B 15/10* (2006.01)
(Continued)

(52) U.S. Cl.
CPC ............... *B29B 13/08* (2013.01); *B29B 7/90* (2013.01); *B29B 7/905* (2013.01); *B29B 15/10* (2013.01);
(Continued)

(58) Field of Classification Search
CPC ........... B29B 13/08; B29B 7/905; B29B 7/90; B29B 15/10; B29B 15/08; B29C 70/12;
(Continued)

(56) References Cited

U.S. PATENT DOCUMENTS 4,487,880 A 12/1984 Ueno et al.
5,403,654 A * 4/1995 Muto ..................... D04H 1/587
428/378
(Continued)

FOREIGN PATENT DOCUMENTS

CN 103567046 A 2/2014
EP 0370512 A2 5/1990
(Continued)

OTHER PUBLICATIONS

Sheet Molding Compound, https://www.idicomposites.com/smc-bmc-overview.php, accessed Aug. 19, 2021 (Year: 2016).*
(Continued)

Primary Examiner — S. Behrooz Ghorishi
(74) Attorney, Agent, or Firm — MaxGoLaw PLLC

(57) ABSTRACT

A process and system are provided for introducing chopped and dispersed carbon fibers on an automated production line amenable for inclusion in molding compositions, including the debundling of many carbon fibers collectively forming a tow into dispersed chopped carbon fibers that form a filler that undergoes plasma treatment prior to introducing coating silanes to uniformly increase bonding sites for coupling to a thermoset matrix. By exposing carbon tow to a plasma discharge, the carbon tow debundles and is used to form
(Continued)

sheets of molding compositions with chopped dispersed fibers added to the composition, as the sheets move along a conveyor belt on the automated production line and at least one plasma generator mounted above the conveyor belt ionizes the carbon fibers. With resort to deionized air to mix plasma-treated chopped fibers, still further dispersion results.

20 Claims, 3 Drawing Sheets

(51) Int. Cl.
| | | |
|---|---|---|
| *B29C 70/12* | (2006.01) | |
| *B29C 70/50* | (2006.01) | |
| *B29B 7/90* | (2006.01) | |
| *B29K 507/04* | (2006.01) | |
| *B29K 509/08* | (2006.01) | |
| *B29B 15/08* | (2006.01) | |

(52) U.S. Cl.
CPC ............ *B29C 70/12* (2013.01); *B29C 70/502* (2013.01); *B29B 15/08* (2013.01); *B29K 2507/04* (2013.01); *B29K 2509/08* (2013.01)

(58) Field of Classification Search
CPC .............. B29C 70/502; B29K 2507/04; B29K 2509/08; D06M 15/507; D06M 15/41; D06M 15/55; D06M 13/5135; D06M 13/513; D06M 10/025; D04H 1/4242; D04H 1/4218; D04H 1/732
See application file for complete search history.

(56) References Cited

U.S. PATENT DOCUMENTS

| | | | |
|---|---|---|---|
| 5,565,049 A | 10/1996 | Simmons et al. | |
| 6,029,897 A * | 2/2000 | Jander | B29B 11/16 |
| | | | 239/654 |
| 8,309,644 B1 * | 11/2012 | Huang | D06M 13/5135 |
| | | | 524/495 |
| 2015/0147543 A1* | 5/2015 | Guha | D01G 1/04 |
| | | | 428/213 |
| 2016/0288432 A1 | 10/2016 | Macher et al. | |

FOREIGN PATENT DOCUMENTS

| | | | |
|---|---|---|---|
| EP | 1077805 A1 | 2/2001 | |
| JP | S5982466 A | 5/1984 | |
| JP | S62111493 A | 5/1987 | |
| JP | 2002506754 A | 3/2002 | |
| JP | 2011058102 A | 3/2011 | |
| WO | 9947342 | 9/1999 | |
| WO | 2013166132 A1 | 11/2013 | |
| WO | WO-2015033222 A2 * | 3/2015 | ............. B05C 19/02 |

OTHER PUBLICATIONS

Meriam-Webster Dictionary, https://www.merriam-webster.com/dictionary/vortex, accessed Dec. 8, 2021 (Year: 2009).*
Supplemental ESR issued in corresponding appln. No. EP17876737, dated May 29, 2020.
Notice of Reasons for Rejection issued in corresponding Japanese Patent Appln. No. 2019-525870, dated Oct. 7, 2021.

* cited by examiner

DISPERSED FIBER MAT FORMATION

CROSS-REFERENCE TO RELATED APPLICATION

This application claims priority of U.S. Provisional Patent Application Ser. No. 62/427,989 filed Nov. 30, 2016, which is incorporated herein by reference.

FIELD OF THE INVENTION

The present invention in general relates to fiber mat formation using bulk chopped fibers and in particular to in-situ treatment of fibers with plasma and/or silanes to bond fibers to a matrix resin during cure to form chopped fiber preform mats.

BACKGROUND OF THE INVENTION

The economic and environmental pressures to produce vehicles that are lighter and stronger have only accelerated in the past few years. While weight savings were traditionally achieved by migrating from steel components to aluminum, even with the resort to newly engineered structures with reinforced stress points to account for the use of less metal, the ability to glean additional weight saving from aluminum components is diminishing. Sheet molding compositions (SMC) and resin transfer moldings (RTM) that are based on thermoset resin matrices have a lower inherent density than aluminum. The ability to mold complex components also represents a potential advantage of such materials over aluminum. However, thermoset made components have made only sporadic inroads in the replacement of aluminum vehicle components when thermoset resins are reinforced with high loads of inorganic particulate and glass fibers which increase the overall density of the component. The usage of polymeric fillers and hollow glass microspheres reduce the density of thermoset resin based vehicle components and are even able to achieve the high sheen surfaces demanded for vehicle exterior body panels. U.S. Pat. No. 7,700,670 is representative of this effort. Yet thermoset resin based vehicle components could achieve greater market acceptance with higher strength components. While U.S. Pat. No. 7,700,670 teaches the use of surface modification of such low-density fillers to cross link the fillers to the thermoset resin and thereby increase the strength of the resulting component, the number of active sites present on surface of such filler particles is often less than desired to achieve optimal component strength.

Fillers, under ambient conditions are often contaminated by adsorbed hydrocarbons and dust particles. Such contamination may result, in reduced adhesion between matrix and the filler surface. Therefore, it is important to ensure a certain level of filler surface cleanliness. There are several cleaning methods available: dust particles can be blown, rubbed or washed away, for example by sonicating in organic solvents as acetone and various alcohols. To remove organic contamination various wet cleaning procedures can be chosen, UV and ozone. Most often the wet cleaning procedures resort to the use of organic solvents and/or strong acids and bases; these are environmentally disfavored. Advantages of the plasma cleaning are the lower production of hazardous waste and the shorter treatment times.

While plasma cleaning of glass surfaces is well known, there has been little attention paid to the creation of active surface sites on filler particle surfaces as a preliminary to covalently bonding a coupling agent to the filler surface so as to achieve bonding between the coupling agent and the matrix during thermoset cure. Powder plasma reactors have been developed largely for small batch experimental uses (K. Tsusui, K. Nishizawa and S. Ikeeda, Plasma Surface Treatment of an Organic Pigment, Journal Coatings of Technology 69 (1988) 107) and generally are not suitable for uniformly increasing the bonding sites on filler particles such as glass microspheres, as needed in the thermoset resin molding industry.

As noted above fiber inclusions may be used to strengthen a matrix. Well established mechanisms for the strengthening include slowing and elongating the path of crack propagation through the matrix, as well as energy distribution associated with pulling a fiber free from the surrounding matrix material. In the context of sheet molding composition (SMC) formulations and bulk molding composition (BMC) formulations; hereafter referred to collectively as "molding compositions", fiber strengthening has traditionally involved usage of chopped glass fibers. There is a growing appreciation in the field of molding compositions that replacing in part, or all of the glass fiber in molding compositions with carbon fiber. However, this effort has met with limited success owing to differences between glass and carbon fibers. Specifically, these differences include fiber diameter with glass fibers used in molding compositions having typical diameters of between 16 and 30 microns while carbon fibers typically have diameters of between 2 and 10 microns. Additionally, whereas glass roving fabrics, or bundles typically have tens to hundreds of individual fibers, carbon fiber tows typically come in bundles of thousands and even tens of thousands of individual fibers. A still further difference exists in the fiber-fiber interactions where glass fibers tend to scatter and debundle upon chopping, Van der waals bonding and other inter-fiber surface interactions tend to make carbon fiber disinclined from debundling after chopping into desired lengths for use as reinforcement in a molding composition. While the debundling of carbon fiber tows is addressed in laboratory scale moldings through manual manipulation, problems exist for production scale debundling of carbon fiber tow into separate chopped carbon fibers.

Furthermore, difficulties have been encountered in producing mixed fiber resin matrix articles for the formation of a uniform layer of randomly oriented and intermixed glass fibers and carbon fibers. Similarly, the limited access to mixed fiber rovings and non-wovens has hampered efforts to reduce weight of vehicle body panels. Fibers for fiber reinforced resin molding are typically produced by chopping a tow formed bundles of long fiber lengths into preselected lengths. While glass fibers are usually produced in tows of a few hundred fibers and cut cleanly to produce individual fibers, carbon fibers as stated previously have diameters of about 2 to 10 micrometers, much smaller than glass fibers with diameters of 10 to 25 micrometers, and are manufactured in tows that contain tens of thousands of fibers. Owing to physical and chemical differences carbon fibers tend to form clumps of fibers rather than randomly oriented, individual fibers commonly observed with glass fibers.

Co-pending application Ser. No. 14/398,673 filed on May 1, 2013 entitled "Process of Debundling Carbon Fiber Tow and Molding Composition Containing Such Fibers", herein incorporated by reference provides a process and apparatus to debundle carbon fiber tow into separated chopped carbon fibers in a continuous manner, and facilitates interaction of carbon fibers with molding composition components to enhance the strength of a resulting SMC or BMC. However, debundling even with these processes remains elusive as solvents tend to create an environmental hazard and do not adequately wet and spread fibers that make up the tow.

Thus, there exists a need for an overall process for debundling carbon fiber tow and to treat thermoset fillers to promote bonding to a thermoset matrix.

SUMMARY OF THE INVENTION

A process is provided for forming a fiber mat that includes exposing a chopped fiber filler to plasma to increase activation sites on the fiber filler, coating the fiber filler with a silane, and crosslinking the fiber filler to the thermoset set resin via the activation sites.

A system is provided for debundling fiber tow into chopped fibers. The system includes one or more reels of fiber tow, a cutting element configured to receive the fiber tow to form chopped fiber from the one or more reels of fiber tow that are introduced into a tube having a gas flow, and a moving belt positioned under the tube to collect the chopped fiber exiting the tube under gravity. The system further includes a dispenser positioned along the moving belt for applying one of a siliane or a silisequioxane additive to the chopped fiber, and a treatment chamber that receives the treated chopped fiber.

A process is provided for debundling fiber tow into chopped fibers as a mass on a moving belt for delivery to a treatment chamber. The process includes supplying one or more reels of fiber tow to a cutting system to form chopped fiber, dropping the chopper fiber into a tube with an introduced gas flow to debundle the chopped fiber with formation of a vortex, and collecting the chopped fiber exiting the tube on to the moving belt with gravity. The process further includes chemically treating the chopped fiber with a siliane or a silisequioxane from a dispenser above the moving belt, and providing the chemically treated chopped fiber to the treatment chamber.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DESCRIPTION OF THE INVENTION

Figure 1:
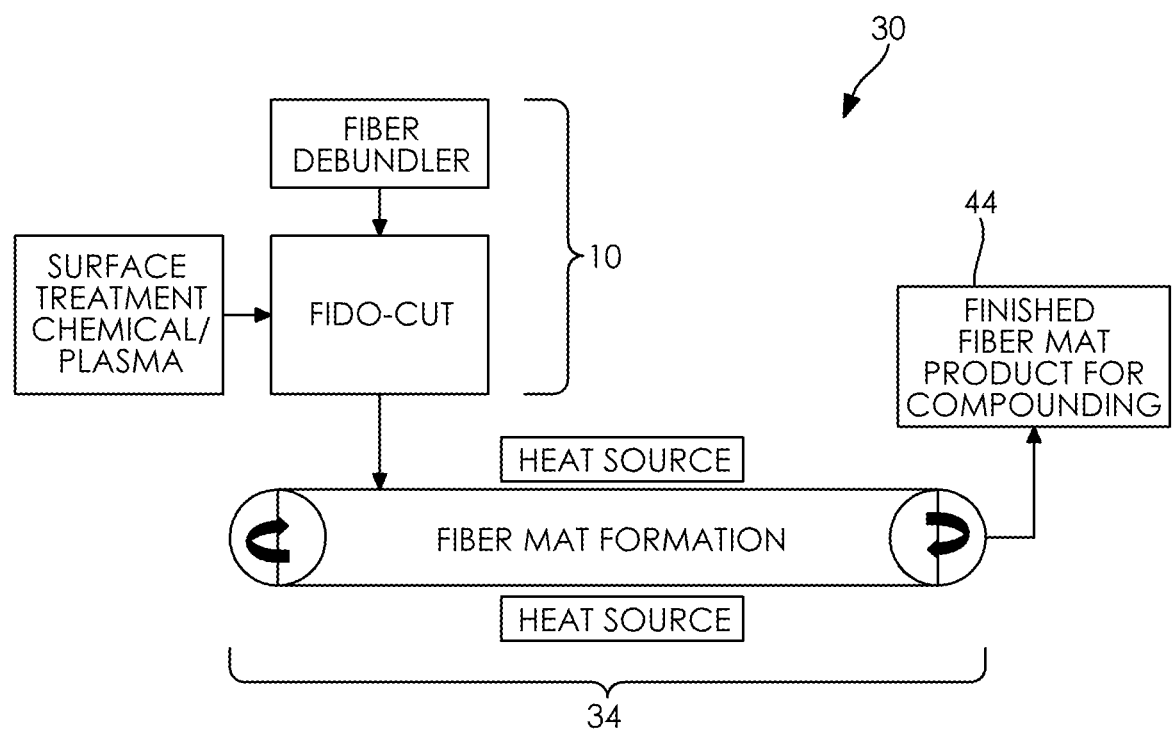
FIG. 1 is a functional block diagram of a system showing the major functional blocks including a fiber dosing and cutting machine and a treatment chamber used in the practice of the invention.

The present invention has utility as a process and system for introducing chopped and dispersed carbon fibers on an automated production line amenable for inclusion in molding compositions, including the debundling of many carbon fibers collectively forming a tow into dispersed chopped carbon fibers that form a filler that undergoes plasma treatment prior to introducing coating silanes to uniformly increase bonding sites for coupling to a thermoset matrix. By exposing carbon tow to a plasma discharge, the carbon tow debundles. Without intending to be limited to a particular theory, ionization of the surfaces of carbon fibers in the tow induces a fiber-fiber electrostatic repulsion. Embodiments of the present invention may be used to form sheets of molding compositions with chopped dispersed fibers added to the composition, as the sheets move along a conveyor belt on the automated production line and at least one plasma generator mounted above the conveyor belt ionizes the carbon fibers. With resort to deionized air to mix plasma-treated chopped fibers, still further dispersion results.

In a specific embodiment, plasma exposure increases the number of active sites on glass spheres prior to coating with silane which leads to more silane-resin bonds for increased strength of the finished thermoset material. Silanes have a reactive other end that cross links to the resin matrix to increase pull out strength of the spheres thereby creating a stronger material. A fluidized bed plasma treatment reactor has been found to afford simultaneous and uniform active site generation around a three-dimensional filler particle.

As used herein, the terms with respect to carbon fiber tow of "lofting" "debundling" and "spreading" are used synonymously. The "de-bundling" of the carbon fibers allows the resin matrix to "wet-out" the individual fibers more completely for better transfer of stresses in the final molded part thus rendering the part better able to withstand stresses and strains in normal usage.

As used herein a microspheroid is defined to include a hollow microsphere or a solid bead having an aspect ratio of between two normal diameters of between 1 and 1.6, with a mean diameter of between 10 and 120 microns for introduction into a base sheet molding compound (SMC) or bulk molding compound (BMC). Typically, a spheroid particle is formed of glass or a thermoplastic material.

It is to be understood that in instances where a range of values are provided that the range is intended to encompass not only the end point values of the range but also intermediate values of the range as explicitly being included within the range and varying by the last significant figure of the range. By way of example, a recited range of from 1 to 4 is intended to include 1-2, 1-3, 2-4, 3-4, and 1-4.

The generation of the plasma introduces the energy necessary to the filler particle surface for forming free radicals that result in bonding sites on the surface of particles. While it is appreciated that this filler surface activation process can occur in a fluidized bed thereby facilitating the use of cold plasma, it is appreciated that hot plasma exposure is also suitable for filler surface activation. Furthermore, the generation of the plasma introduces the energy necessary to the carbon fibers surface for fiber-fiber repulsion to be established so as to cause the tow to expand in volume by more than 50%.

As used herein, the tow volume is defined by the maximal area in a given cross section of tow multiplied by the length of the tow. In instances when a length of the tow is exposed to plasma discharge, the maximal terminal area multiplied by the length of the chopped tow portion defines the tow volume. While it is appreciated that the carbon fiber tow debundling process can occur on a conventional elastomeric conveyor thereby facilitating the use of cold plasma, it is appreciated that hot plasma exposure is also suitable for carbon fiber tow debundling with the use of hot plasma temperature compatible surrounding equipment.

For example, the temperature of hot plasma generation is approximately 1000° C. The separation of the conveyor from the generation of the plasma, and the reduction in pressure results in the carbon fiber tow being exposed to distinctly lower temperatures. Plasma is readily generated at a variety of pressures from 0.00001 to 1 atmosphere (atm), in certain inventive embodiments, the plasma generating pressure ranges from 0.0001 to 0.1 atm for generating the plasma. Debundling of the carbon fiber tow occurs at temperatures as low as 20° C. Typically, debundling temperatures range from 20-250° C. In still other embodiments, debundling temperatures range from 40-200° C.

Plasma generation occurs in a variety of gases, with the choice of gas being dictated by the type of surface activation desired. Illustrative non-limiting examples of the variety of gases used in plasma generation include oxygen, air, nitrogen, carbon dioxide, the noble gases, and mixtures thereof. By way of example, processes requiring ion bombardment as a primary mechanism—such as reactive ion etching—the power density to the plasma, expressed in units of Watts per cubic centimeter per kiloPascal of pressure, will be higher than for processes where neutral species only are required, such as deposition of oxygen species, or where electron sputtering predominates. Typically, ion-based processes have power densities that are roughly between about 3 and 100 $W/cm^3/kPascal$, while neutral-based processes have densities between about 0.1 and about 10 $W/cm^3/kPascal$.

Ion bombardment induced activation is readily performed with inert gases such as nitrogen, neon, or argon. In some inventive embodiments, a chemical vapor deposition (CVD) precursor is added to the gas in the fluidized bed to add specific functionality to the carbon fiber surfaces.

In certain inventive embodiments, the tow is a single carbon fiber; a single glass fiber tow, or a hybrid tow containing both glass and carbon fibers that is chopped and distributed. In still other inventive embodiments, multiple tows are simultaneously input, the multiple tows being carbon, glass, or a combination thereof. Typical lengths of chopped fibers used in the present invention typically range from 0.1 to 5 centimeters (cm). The diameters of fibers are appreciated to vary widely based on commercial sources with glass fibers typically having a diameter of between 16 and 30 microns while carbon fibers typically have diameters of between 2 and 10 microns. It should be appreciated that fiber dimensions outside of the aforementioned typical ranges exist and are intended to be within the scope of the present invention The tow or tows are subjected to a cutting element that divides the tow into preselected lengths of cylindrical bundles of fibers. The cutting element includes a variety of conventional blades including a spinning chopper blade, a liner actuated chopper blade, a water jet, and a laser cutter.

According to the present invention, chopped tow fibers are fed into a pressuring gas flow in a tube to induce a vortex of tumbling fibers. By controlling the time and rotation rate in the vortex, a desired degree of tow dispersion into small clusters of fibers, individual fibers or a combination thereof is obtained. The vortex formation dynamics are known to the art. M. F. Unal and D. Rockwell (1988). Journal of Fluid Mechanics, 190, pp 491-512. While the use of a cylinder as a tube is appreciated to offer advantages in terms of uniformity owing to the limited ability of swirling gas and fibers to form eddies therein and is uniform in vertical cross-section, it is appreciated that other tube shapes are also operative herein including spherical, hemispherical, conical, and polygonal cross-section shapes, where the cross-section is triangular, square, and higher order right polygons. Briefly, by directing a pressurized gas flow at and into a tube containing the chopped fibers with both rotary and vertical flow components, a vortex is formed. The dwell time of fibers in the cylinder may be extended to near infinite time by controlling the upward gas flow. In some embodiments, the tube itself is rotated as well to further enhance fiber debundling and mixing in the vortex. The use of deionized gases, such as air, as the pressurized gas flow results in still further dispersion, compared to the corresponding untreated gas.

Gases suitable for forming a vortex in a tube are limited only to compatibility with the fibers. Exemplary gases operative herein illustratively include air, nitrogen, carbon dioxide, carbon monoxide, hydrogen, noble gases, and a combination thereof. It is appreciated that in addition to debundling fibers, the tube is readily provided with electrodes, 24 in FIG. 2, to support an atmospheric pressure plasma to perform surface modification of the fibers during debundling. By way of example, surface functionality is added through plasma treatment during debundling or a fiber sizing is chemically modified to render the fiber more reactive toward a subsequently applied matrix. U.S. Pat. No. 9,149,834 is representative of such fiber modification.

In still other inventive embodiments, the gas flow entrains a stream of particulate fillers so as to form a debundled fiber mass that includes such filler particles interspersed therethrough. Particulate fillers that are entrained within such a gas flow illustratively include inorganic particles such as silica, carbon black, calcium carbonate, a hollow glass microspheres; synthetic organic particles such as polymeric beads of polystyrene, and hollow polymeric beads; and naturally occurring particles such as ground shells and husks of plants such as coconut, rice hulls, walnut shells; egg shells; and combinations thereof. Particles for entrainment are provided in a particulate reservoir 22 in FIG. 2 that meters particulate into a gas stream passing thereby.

Regardless of whether chemical modification occurs in the tube, the debundled fibers are gravity fed onto an underlying belt with a generally random fiber orientation in the plane defined by the belt. It is appreciated that such debundled fibers will tend to lay in the plane of the belt on initial deposition, defined a zero-degree angle relative to the belt plane, yet as the thickness of a layer of fibers builds on the belt, the average fiber angle of incline relative to the belt increases to values from greater than 0 to 60 degrees.

By sizing the tube relative to the width of the belt, a lateral distribution of fibers is obtained that varies by less than 20 fiber number percent across the width of the chopped fiber mass on the belt in some inventive embodiments. While in other inventive embodiments, the later distribution of fibers is less than 10 fiber number percent. It is appreciated that with resort to an inward angled rail, relative to the direction of movement of the belt, that fibers at the edges of the belt are preferentially urged inward to create a narrower lateral width of fibers on the belt, but a width that is more uniform. In some embodiments the tube is pivoted side to side relative to the direction of belt movement to vary the lateral distribution of chopped fibers on the belt.

The debundled fibers in some embodiments are chemically treated either within the tube or on the belt. Chemical treatments operative herein illustratively include silanes, silisequioxanes (SQs), and combinations thereof. It is appreciated that chemical treatments in some embodiments are accomplished with heating, actinic radiation, or plasma to promote bond formation between the additive and the fiber.

A surface activating agent that bonds to chopped fibers illustratively including carbon and glass fibers following exposure to the plasma source is an alkoxysilane where the silane is reactive with the silica surface of the fibers. Representative alkoxysilane surface activating agents for chopped fibers illustratively include) aminopropyltrimethoxysilane, 3-aminopropyltriethoxysilane, 3 glycidoxypropyltrimethoxysilane, 3-glycidoxypropyltriethoxysilane, (3 glycidoxypropyl) bis(trimethylsiloxy)methylsilane, (3 glycidoxypropyl)methyldiethoxysilane, (3-glycidoxypropyl) dimethylethoxysilane, (3 glycidoxypropyl)methyldimethoxysilane, methacryloxymethyltriethoxysilane, methacryloxymethyltrimethoxysilane, methacryloxypropyldimethylethoxysilane, methacryloxypropyldimethylmethoxysilane, ethacryloxypropylmethyldimethoxysilane, methacryloxypropyltriethoxysilane, methoxymethyltrimethylsilane, 3-methoxypropyltrimethoxysilane, 3 methacryloxypropyldimethylchlorosilane, methacryloxypropylmethyldichlorosilane, methacryloxypropyltrichlorosilane, 3 isocyanatopropyldimethylchlorosilane, 3 isocyanatopropyltriethoxysilane, bis(3 triethoxysilylpropyl) tetrasulfide, and combinations thereof. More preferably, the silane surface activating agent includes an ethenically unsaturated moiety that is reactive under free radical cross-linking conditions so as to covalently bond with the chopped fibers to the surrounding SMC or BMC matrix.

In some embodiments of the present invention, particulate filler is applied as a layer at this point in the belt transit. The particulate fillers including the aforementioned materials.

A binder may then be sprayed on the chopped fiber mass. It is appreciated that the fiber mass in some inventive embodiments is compressed prior to spray application of the binder. The binder is applied neat or as a suspension or solvate in a solvent. Binders operative herein illustratively include latexes, epoxies, phenolic resins, and polyesters; and combinations thereof. It is appreciated that binder spray in some embodiments is accomplished with heating, actinic radiation, or plasma to promote bond formation between the binder and the fiber.

Embodiments of the present invention provide an improved fiber dispersion in terms of lateral uniformity, randomness in the plane of the belt, inclusion of particulate therein, debundling, or a combination of any of the aforementioned as compared to existing processes. The control of fiber properties and the continuous production process to produce a binder retained fiber mass according to the present invention is then available in certain embodiments to be dispersed in molding composition formulations prior to formulation cure, as well as for use in perform mats for use in composite molds illustratively including SMC and resin transfer molding (RTM). Preform mats formed by the inventive process and system for thermoset resin composition molding that upon cure form a variety of molded and fiber reinforced articles. Such articles are used in a variety of applications such as vehicle components such as bed lines, body components, trim, interior components, and undercar components; architectural components such as trim and doors, marine components such as hulls, trim, and cockpit pieces; and similar structures in aerospace settings.

Figure 2:
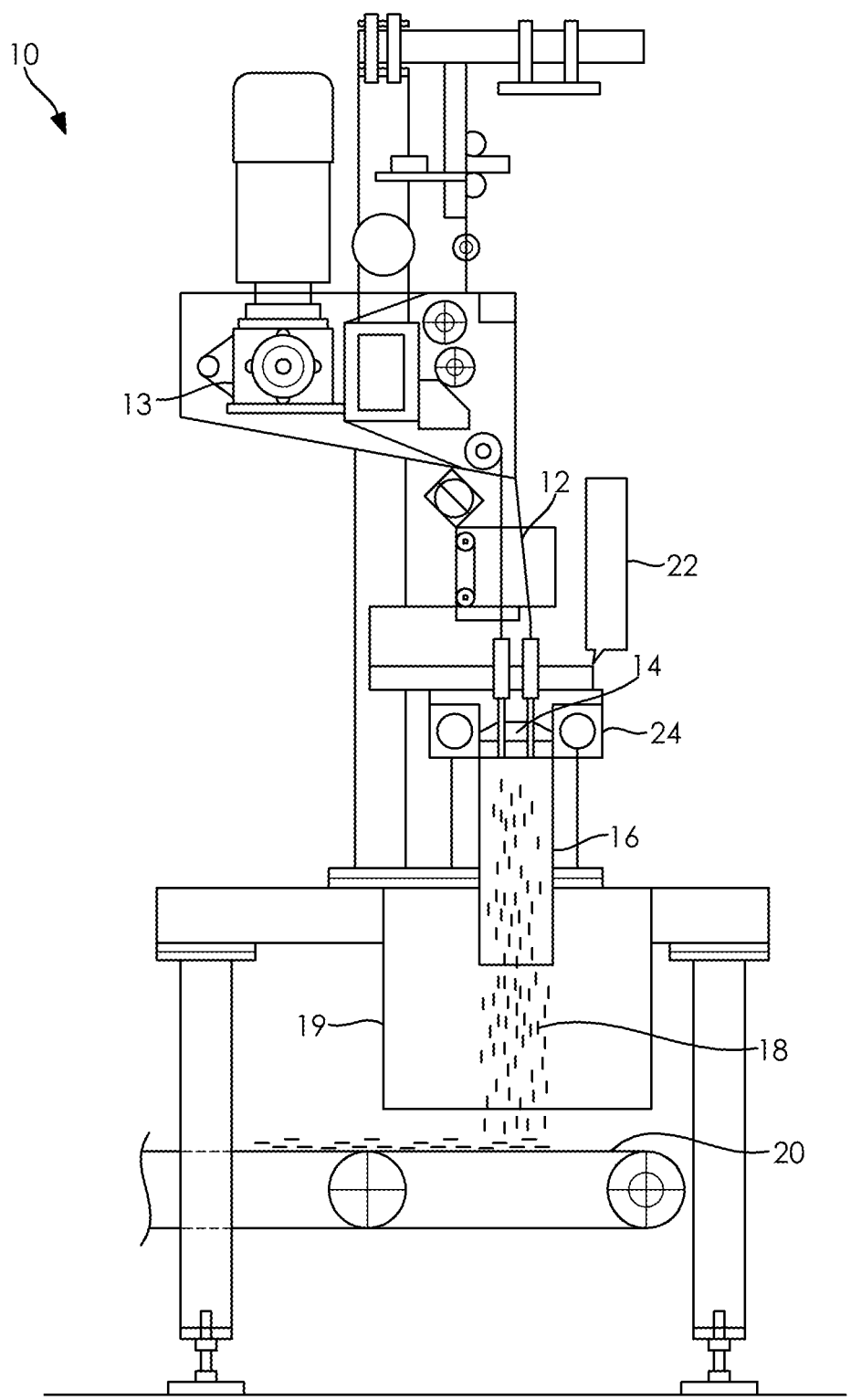
FIG. 2 is a cross sectional view of a fiber dosing and cutting machine according to the present invention operative in cutting and debundling fiber tow for disbursement in a perform mat or composite material.
Figure 3:
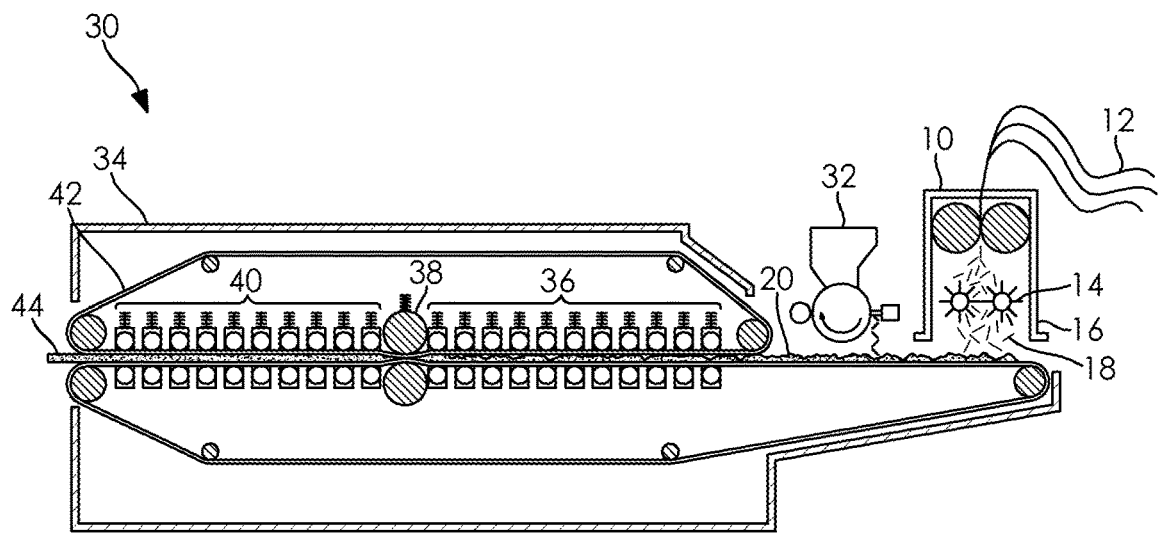
FIG. 3 is a detailed cross-sectional view of the system shown in FIG. 1 for producing a chopped fiber perform mat with the fiber dosing and cutting machine shown in FIG. 2 in accordance with embodiments of the invention.

Referring now to the figures, FIGS. 1-3 illustrate a system 30 for forming fiber mats 44 for use in SMC and RTM. FIG. 1 is a functional block diagram of the system 30 showing the major functional blocks including a fiber dosing and cutting machine 10 and a treatment chamber 34. FIG. 2 is a cross sectional view of a fiber dosing and cutting machine and is shown generally at 10. One or more fiber tows 12 are fed from feeder reels 13 into a cutting element 14 as detailed above for chopping the tow. The one or more fiber tows may be the same material, or the tows may be a mixture of glass, carbon, natural, and chemical based tows. The chopped fibers are dropped downward through a tube 16 under helical gas flow in a vortex to separate and disperse the chopped fibers 18 on to a moving belt 20. The tube 16 in some embodiments includes a plasma generation electrode set 24. As shown in the system view 30 in FIG. 3, the chopped fibers 18 exiting from the fiber dosing and cutting machine 10 and on to the moving belt are coated with a binder applied from a dispenser 32. The nature of the binder having been detailed above. It is appreciated that a similar dispenser to dispenser 32 is used to dispense a chemical additive prior to, or subsequent to the binder dispenser 32. Such additives include the aforementioned. While not shown for visual clarity, the application of a binder or an additive each independently is accompanied with an activation energy input such as a thermal source, a light source, or a plasma source. The treated fibers are then moved in to a treatment chamber 34 where the filers are pressed with rollers 38 between the moving belt 20 and an upper moving belt 42 into a sheet or mat 44. The treatment chamber has a first heating section 36 that cures the chemically treated fibers 20, and a second cooling section 40 prior to the exit of the sheet or mat from the chamber 34. It is appreciated that the atmosphere in chamber sections 36 and 40 are each independently controlled and illustratively include air or inert gases of a preselected temperature.

Figure 4:
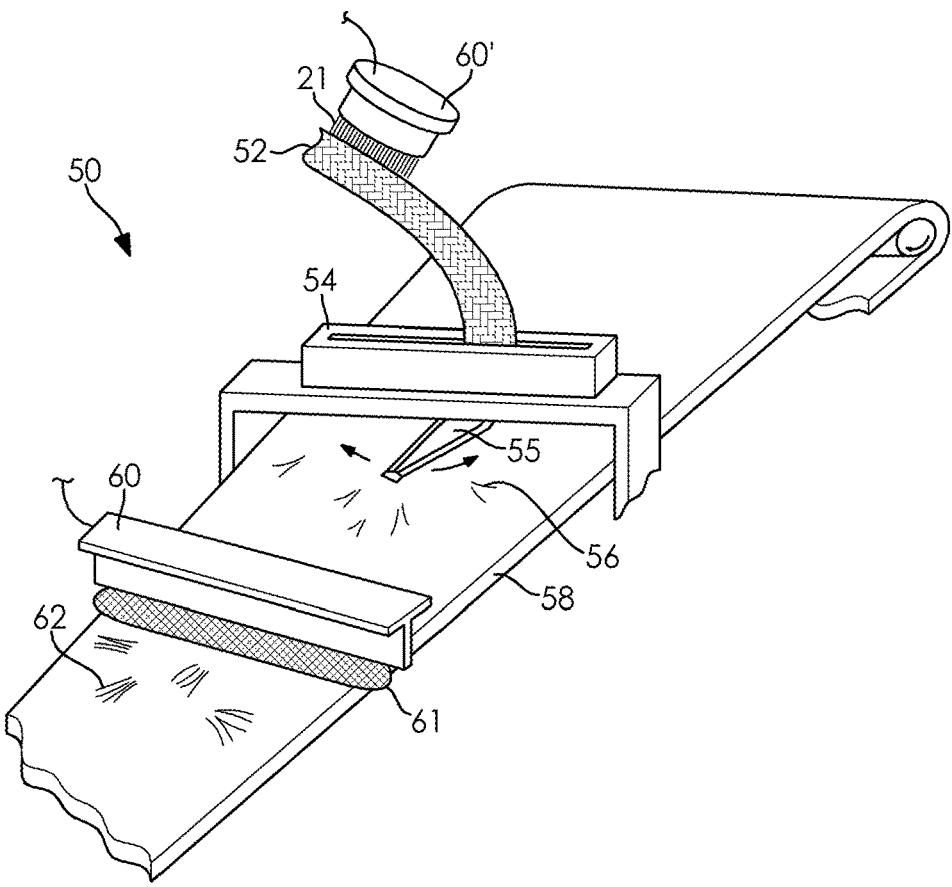
FIG. 4 is a schematic of the entry portion of the conveyor equipped treatment chamber with a plasma generator source impinging on carbon fiber tow in accordance with an embodiment of the invention.

In an embodiment of an inventive apparatus that is shown in FIG. 4 generally at 50, one or more tows of carbon fiber 52 are fed into a conventional chopper 54 at a preselected rate relative to the speed of operation of the chopper 54 to yield preselected lengths of carbon fiber tow 52. These lengths of chopped carbon fiber tow 56 are collected on a conveyor 58 passing beneath the chopper 54. In some embodiments, the chopped lengths of tow 56 are further randomized as to position and orientation along the width of the conveyor 58 with resort to spreader 55. The one or more plasma generating sources 60 are mounted above the conveyor 58 such that the preselected lengths of chopped carbon fiber tow 56 are exposed to plasma generated by the one or more plasma generating sources 60. Under the influence of plasma 61 exposure the lengths of chopped carbon fiber tow 56 expand to more than 50 percent of the pre-plasma exposure to form a lofted tow 62 and in other embodiments to volumes of more than 200 percent of pre-plasma treatment sizes. In some embodiments the conveyor 58 has a width that ranges between 0.9 to 1.8 meters. The extent of the volume increase is controlled by factors including the ion energy of the plasma, the plasma flux, rate of conveyor movement, carbon fiber sizing identity, number of fibers in the tow, and proximity of plasma source to carbon fibers. In some inventive embodiments, hot plasma is used to effectively debundle both chopped carbon fibers and intact carbon fiber tows.

In still other embodiments, one or more plasma generating sources 60' are provided in place of, or in concert with the one or more plasma generating sources 60. It is appreciated that the plasma generating source 60' is of the same type as a generator 60, or varied as to operational parameters to loft the tow 52 prior to entering the chopper 54. In an inventive embodiment, the carbon fiber tow 52 ranges at least 1,000 carbon fibers to at least 10,000 carbon fibers and in other embodiments 50,000 carbon fibers or even more fibers per tow. It is appreciated that the plasma generating source 60 emits a cylindrical plasma from a circular electrode, or a rectilinear volume of plasma from a race trackshaped annulus. The chopped carbon fiber obtained according to the present invention is then available in certain embodiments to be dispersed in sheets of molding composition formulations prior to formulation cure as the sheets move along a production line conveyor. Through control of the molding composition monomer polarity in a thermoset resin, still further dispersion and anisotropy of the chopped, plasma lofted carbon fibers is obtained.

In other inventive embodiments, the debundled fibers are conveyed into a rapid thermal multi-processing (RTM) system in general and specifically to a mold corresponding to a carbon fiber pre-form or mat for a RTM molding. The debundled fibers of the present invention provide higher strength moldings. Without intending to be bound to a particular theory fiber wetting is enhanced by the inventive process.

The stability of the plasma, the heat stress on the fibers and particles, fiber and particle surface area, fiber and particle loading, and the homogeneity and quality of the activation of the fiber and particles are influenced by the pressure and gas flow conditions within the plasma and in the fluidized bed. Determination of a desired level of activation is measured by iteration with iodometry titration, or simply reaction with coupling agents to the activated particles and testing of final thermoset article properties. In some embodiments, in order to reduce the temperature further, to cool the gas during generation of the plasma, jacketed cooling tubes are employed that are charged with a suitable gaseous or liquid coolant. Air and water are exemplary gaseous and liquid coolant fluids.

EXAMPLE

Production of Activated Glass Microspheres

Carbon fibers having a diameter of 4 microns are tested by iodometry and subjected to oxygen plasma treatment with an increase in active sites as measured by iodometry to have increased by a factor of 90. The reactor is operated at about 80° C. under about 0.0002 atm. Plasma-activated oxygen radicals are generated with volume flows under standard conditions were about 560 ml/min. The carbon fiber exposure lasted 30 minutes. The resulting activated carbon fibers are chemically bonded to the alkoxysilane surface coupling agent 3-glycidoxypropyltrimethoxysilane. Upon cure in a standard styrene based SMC matrix, the resulting material has superior strength as measured by resistance to fracturing as compared to non-treated carbon fibers exposed to the same coupling agent.

The foregoing description is illustrative of particular embodiments of the invention, but is not meant to be a limitation upon the practice thereof. The following claims, including all equivalents thereof, are intended to define the scope of the invention.

The invention claimed is:

1. A process of forming a fiber mat comprising:
exposing a chopped fiber filler having an initial tow volume to plasma in a tube, said plasma formed in a vortex having both rotary and vertical flow components while said chopped fiber filler is being debundled to increase activation sites on said chopped fiber filler and to expand the chopped fiber filler to a lofted tow volume that is more than 50% greater than the initial tow volume, said vortex using gravity to drop and disperse said chopped fiber filler on to a moving belt;
rotating said tube to further enhance the debundling and mixing of said chopped fiber filler in the vortex;
coating said chopped fiber filler with a silane; and
crosslinking said silane coated chopped fiber filler to a thermoset resin via the activation sites.

2. The process of claim 1 wherein said chopped fiber filler is made up of only carbon fibers.

3. The process of claim 1 wherein said chopped fiber filler is made up of a combination of carbon fibers and glass fibers.

4. The process of claim 1 further comprising measuring the increase in activation sites by iodometry.

5. The process of claim 1 further comprising debundling a carbon fiber tow as all or part of said chopped fiber filler prior to exposure to the plasma.

6. The process of claim 1 further comprising exposing said chopped fiber filler to deionized gas.

7. A process for debundling fiber tow into chopped fibers as a mass on a moving belt for delivery to a treatment chamber comprising:
supplying one or more reels of fiber tow to a cutting system to form chopped fiber;
dropping the chopper fiber into a rotating tube with an introduced gas flow to debundle the chopped fiber with formation of a vortex;
collecting the chopped fiber exiting the rotating tube on to the moving belt with gravity;
chemically treating the chopped fiber with a silane or a silisequioxane from a dispenser above the moving belt; and
providing the chemically treated chopped fiber to the treatment chamber.

8. The process of claim 7 wherein the introduced gas flow applies rotary and vertical components to the chopped fibers.

9. The process of claim 7 further comprising applying a plasma discharge in the tube.

10. A system for debundling fiber tow into chopped fibers according to the process of claim 1 comprising:
one or more reels of fiber tow;
a cutting element comprising a blade configured to receive the fiber tow to form chopped fiber from the one or more reels of fiber tow that are introduced into a rotating tube having a gas flow to form a plasma in vortex while the chopped fiber is being debundled;
a moving belt positioned under the rotating tube to collect the chopped fiber exiting the tube under gravity;
a dispenser positioned along the moving belt for applying one of a silane or a silisequioxane additive to the chopped fiber to form treated chopped fibers; and
a treatment chamber that receives the treated chopped fibers.

11. The system of claim 10 wherein the fiber tow is at least one of glass; carbon; polyimides; polyesters; or polyamides, and combinations thereof.

12. The system of claim 10 wherein a binder is applied and forms a perform mat in the treatment chamber.

13. The system of claim 12 further comprising a source of thermal actinic, or plasma energy associated with the dispenser to promote a chemical reaction between the binder of the additive and the chopped fiber.

14. The system of claim 12 wherein the treatment chamber further comprises a first heating section that cures the treated chopped fibers, and a second cooling section prior to the exit of the preform mat from the treatment chamber.

15. The system of claim 10 further comprising a particulate reservoir in fluid communication with the gas flow.

16. The system of claim 10 further comprising a rail angled inward relative to the direction of movement of the moving belt to urge some of the treated chopped fibers toward a center line of the moving belt.

17. The system of claim 10 wherein the treatment chamber further comprises a set of rollers to flatten the treated chopped fiber on the moving belt.

18. The system of claim 10 wherein the treatment chamber further comprises an upper moving belt.

19. The system of claim 10 wherein the cutting element further comprises a series of blades.

20. The system of claim 10 further comprising a plasma generator to introduced a plasma gas flow for the gas flow in the tube, said rotating tube configured to receive said chopped fiber and to create a debundling vortex.

* * * * *